United States Patent [19] … [11] Patent Number: 4,990,552
Mori et al. … [45] Date of Patent: Feb. 5, 1991

[54] FLAME RETARDANT SILICONE OIL COMPOSITION

[75] Inventors: Shigeru Mori; Satoshi Kuwata; Motohiko Hirai, all of Gunma, Japan

[73] Assignee: Shin-Etsu Chemical Co., Ltd., Tokyo, Japan

[21] Appl. No.: 301,084

[22] Filed: Jan. 25, 1989

[30] Foreign Application Priority Data

Jan. 26, 1988 [JP] Japan .................................. 63-15174

[51] Int. Cl.$^5$ .............................................. C08K 5/41
[52] U.S. Cl. ..................................... 524/176; 524/115; 524/152; 524/261; 524/267; 524/385; 524/386; 524/379; 556/401
[58] Field of Search ................. 556/401; 524/115, 152, 524/176, 261, 267, 385, 379, 386

[56] References Cited

U.S. PATENT DOCUMENTS 4,603,168  7/1986  Sasaki et al. .......................... 522/30

Primary Examiner—Melvyn I. Marquis
Attorney, Agent, or Firm—Millen, White & Zelano

[57] ABSTRACT

A silicone oil used, for example, as an electric insulation oil can be imparted with greatly increased flame retardancy when it is compounded with a soluble platinum compound, e.g., chloroplatinic acid, and an alkynyloxy, e.g., ethynyloxy, containing compound or, in particular, an ethynyloxy-containing organosilicon compound. The heat resistance of the silicone oil composition can be further improved by admixing the composition with an organosilicon compound having at least one imino-containing aromatic group such as a 4-anilinophenoxy group bonded to the silicon atom.

8 Claims, No Drawings

FLAME RETARDANT SILICONE OIL COMPOSITION

BACKGROUND OF THE INVENTION

The present invention relates to a flame-retardant silicone oil composition, more particularly, to a flame-retardant silicone oil composition having greatly decreased combustibility and which is imparted with excellent self-extinguishability and heat resistance without affecting the excellent electrical properties and heat resistance inherent in silicone oils so as to be safely useful in respect of the as an insulating oil in electric instruments.

Several different types of electric insulation oils are known and have been used in electric instruments such as electric power cables, capacitors, transformers and the like, including mineral oils, phosphate ester-based oils, aromatic hydrocarbon oils, chlorinated synthetic oils, silicone oils, fluorocarbon oils and the like. The oils of each class have their own advantages and disadvantages. For example, mineral oils, aromatic hydrocarbon oils and silicone oils, in particular, having a relatively low viscosity are inflammable. Chlorinated synthetic oils have a toxicity problem. Flurocarbon oils generally have a relatively high specific gravity and thus cause an unavoidable increase in the weight of the electric instruments filled therewith, if not to mention the outstanding expensiveness of these oils as compared with the oils of other classes.

Silicone oils having a high viscosity are relatively flame-retardant but still are combustible enough to be classified as combustible oils by the glass tape test method specified in JIS C 2101. Flame retardance of silicone oils can be enhanced by compounding the oil with a flame retardant agent or combustion retarder compatible therewith as is proposed in Japanese Patent Kokai 49-39173, 51-20720 and 59-226408. The flame retardant agents proposed there are mostly organosilicone compounds with a few of fluorocarbon oils having relatively high vaporizability so that the flame retardancy imparted by compounding these agents is not maintained sustainedly over a long period of time. Several brominated compounds and phosphorus-containing organic compounds also have been proposed as a flame retardant agent but these compounds have problems of corrosiveness against metals and adverse influences on the electric properties of the oil compounded therewith as well as the instability of the flame retardance imparted thereby.

SUMMARY OF THE INVENTION

The present invention accordingly has an object to provide a novel and improved flame retardant oil composition suitable as an electric insulation oil which is free from the above described problems and disadvantages in the prior art oil compositions and, which is based on a silicone oil compounded with a specific flame-retardant agent.

Thus, the flame-retardant silicone oil composition of the invention comprises, in admixture:

(a) 100 parts by weight of an organopolysiloxane represented by the average unit formula

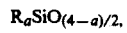  (I)

in which R is a substituted or unsubstituted monovalent hydrocarbon group and the subscript a is a positive number in the range from 1.8 to 2.3, from 0.1 to 30% by moles of the groups denoted by R in a molecular being vinyl groups;

(b) from 0.0001 to 0.1 part by weight as platinum of a platinum compound soluble in an organic solvent; and (c) from 0.001 to 10 parts by weight of an alkynyloxy-containing compound selected from the group consisting of
- (c-1) alkynols,
- (c-2) alkyne diols, and
- (c-3) alkynyloxy-substituted organosilicon compounds.

It is preferable that the flame-retardant silicone oils composition of the invention defined above further comprises:

(d) from 0.01 to 10 parts by weight, per 100 parts by weight of the component (a), of an organosilicon compound selected from the group consisting of
- (d-1) metallosiloxane compounds containing a metallic element selected from cerium or a combination of rare earth elements with cerium as the principal constituent, titanium, zirconium and hafnium,
- (d-2) organosilicon compounds having, in a molecule, at least one unit of aromatic amines, and
- (d-3) organosilicon compounds having, in the molecule, at least one unit of hindered phenols.

DETAILED DESCRIPTION OF THE PREFERRED EMBODIMENTS

As is understood from the above description, the flame-retardant silicone oil composition of the invention is characterized by the formulation of a combination of a platinum compound and a specific alkynyloxy-containing compound selected from the three classes of (c-1), (c-2) and (c-3) defined above as a flame-retardant agent and, optionally, a specific heat-resistance improver selected from the three classes of (d-1), (d-2) and (d-3) defined above compounded with a specific organopolysiloxane oil.

The principal constituent in the inventive flame-retardant silicone oil composition is an organopolysiloxane as the component (a) represented by the average unit formula

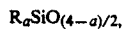  (I)

in which R is a substituted or unsubstituted monovalent hydrocarbon group and the subscript a is a positive number in the range from 1.8 to 2.3, from 0.1 to 30% by moles of the groups denoted by R in a molecule being vinyl groups. The group denoted by the symbol R in the average unit formula is exemplified by alkyl groups, e.g., methyl, ethyl, propyl and butyl groups, cycloalkyl groups, e.g., cyclohexyl group, alkenyl groups, e.g., vinyl and allyl groups, and aryl groups, e.g., phenyl and tolyl groups, as well as substituted monovalent hydrocarbon groups obtained by replacing a part or all of the hydrogen atoms in the above named hydrocarbon groups with substituent atoms and/or groups such as halogen atoms and cyano groups, e.g., chloromethyl, 3,3,3-trifluoropropyl and 2-cyanoethyl groups. It is essential that from 0.1 to 30% by moles of the groups denoted by R in a molecule of the organopolysiloxane are vinyl groups. When the content of vinyl groups in the organopolysiloxane is too low, the silicone oil composition cannot be imparted with full flame retardancy. When the content of vinyl groups in the organopolysiloxane is too high, on the other hand, the silicone oil composition cannot be rendered fully heat-resistant. The viscosity of the organopolysiloxane is not particularly limitative and depends on the intended application of the composition but it is usually preferable that the organopolysiloxane has a viscosity in the range from 5 to 1000 centistokes or, more preferably, from 10 to 100 centistokes at 25° C. when the intended application of the oil composition is as an electric insulation oil, for example, for filling a transformer.

The second essential ingredient in the inventive silicone oil composition is a platinum compound as the component (b). Various types of platinum compounds can be used for the purpose provided that the compound is compatible with the organopolysiloxane as the principal ingredient. Examples of a particularly preferable platinum compound include chloroplatinic acid and triphenylphosphine complex of platinum of the formula Pt[P(C$_6$H$_5$)$_3$] proposed in U.S. Pat. Nos. 3,159,601, 3,159,662 and 3,775,452 as a catalyst for promoting the so-called hydrosilation reaction. The above mentioned chloroplatinic acid may be compound with the organopolysiloxane in the form of a complex with a vinyl-containing organopolysiloxane or as modified with an alcohol such as isopropyl alcohol in order to increase the solubility in the organopolysiloxane. The amount of the platinum compound in the inventive silicone oil composition is in the range from 0.0001 to 0.1 part by weight or, preferably, from 0.001 to 0.01 part by weight calculated as platinum metal per 100 parts by weight of the organopolysiloxane as the component (a). When the amount of the platinum compound is too small, the silicone oil composition cannot be imparted with full flame retardancy. Increasing the amount of the platinum compound over the above mentioned upper limit is undesirable because no further improvement in the flame retardance can be obtained by so increasing the amount rather with an economical disadvantage due to the expensiveness of the platinum compound.

The third essential ingredient in the inventive silicone oil composition is an alkynyloxy group-containing compound as the component (c) including three classes of compounds. The compound of the first class (c-1) is an alkynol or a so-called acetylene alcohol exemplified by 3-methyl-1-butyn-3-ol, 3-methyl-1-penty-3-ol, 3,5-dimethyl-1-hexyn-3-ol, 1-ethynyl-1-cyclohexanol and the like. The compound of the second class (c-2) is an alkyne diol or a so-called acetylene glycol exemplified by 2-butyn-1,4diol, 2,5-dimethyl-3-hexyn-2,5-diol, 4,6-dimethyl-4-octyn-3,5-diol, 2,4,7,9-tetramethyl-5-decyn-4,7-diol and the like.

The third class (c-3) of the alkynyloxy group-containing compounds as the component (c) include organosilicon compounds, i.e. organosilane or organopolysiloxane compounds, having one or more of alkynyloxy groups in a molecule. The organosilicon compounds are represented, for example, by the general formula: R$^1$$_3$SiX; R$^1$$_3$Si—Y—SiR$^1$$_3$; R$^1$$_3$Si—O—(—SiR$^1$$_2$—O—)$_p$—(—SiR$^1$X—O—)$_q$—SiR$^1$$_3$; and X—(—SiR$^1$$_2$—O—)$_n$—SiR$^1$$_2$—X, wherein in each of the formulas, R$^1$ is a monovalent hydrocarbon group exemplified by alkyl groups, e.g., methyl, ethyl, propyl and butyl groups, cycloalkyl groups, e.g., cyclohexyl group, and aryl groups, e.g., phenyl and tolyl groups, as well as substituted monovalent hydrocarbon groups obtained by replacing a part or all of the hydrogen atoms in the above named hydrocarbon groups with substituents exemplified by chloromethyl, 3,3,3-trifluoropropyl and 2-cyanoethyl groups, X is an alkynyloxy group and Y is an alkyndioxy group. The subscript p is zero or a positive integer not exceeding 47 and q is a positive integer not exceeding 48 with the proviso that p+q is a positive integer not exceeding 48 and the subscript n is zero or a positive integer not exceeding 50. When the value of p or n is too large, the desired improving effect on the flame retardancy is obtained only by unduly increasing the amount thereof in the composition which causes certain practical disadvantages. When the subscript q is too large, the organosilicon compound has a decreased solubility in the organopolysiloxane as the component (a) so that difficulties are encountered in obtaining a homogeneous composition.

The above defined alkynyloxy-containing organosilicon compound can be easily obtained by the dehydrochlorination reaction between an organosilicon compound having a reactive chlorine atom such as a chlorinated alkyl silane or polysiloxane compound and an acetylene alcohol or acetylene glycol. The reaction can be performed by mixing the chlorinated alkyl silane or polysiloxane compound and the acetylene alcohol or acetylene glycol in an equivalent amount relative to the chlorine atoms in the former together with a hydrogen chloride acceptor such as ammonia, pyridine and the like, in an organic solvent such as toluene, and agitating the mixture at room temperature or at an elevated temperature followed by filtration of the mixture to remove the precipitated hydrochloride of the acid acceptor and then stripping the filtrate to remove the volatiles including the solvent.

The amount of the above described alkynyloxy-containing compound as the component (c) in the inventive silicone oil composition is in the range from 0.001 to 10 parts by weight or, preferably, from 0.01 to 1.0 part by weight per 100 parts by weight of the organopolysiloxane as the component (a). When the amount thereof is too small, durability of the flame retardancy at elevated temperatures is insufficient. An amount over the above mentioned upper limit does not further increase the desired improvement and has an economical disadvantage.

Though not essential, the flame-retardant silicone oil composition of the invention is further compounded with a specific heat resistance improver as the component (d), which is selected from three classes of compounds (d-1), (d-2) and (d-3) in an amount not exceeding 10 parts by weight per 100 parts by weight of the organopolysiloxane as the component (a).

The compound of the first class of the component (d), i.e. component (d-1), is a metallosiloxane compound represented by the average unit formula

$$R^1{}_b SiO_{(4-b)/2},\qquad (II)$$

in which R$^1$ is a substituted or unsubstituted monovalent hydrocarbon group and the subscript b is a positive number in the range from 1.8 to 2.3, containing atoms of at least one kind selected from cerium, optionally combined with a minor amount of other rare earth elements, titanium, zirconium and hafnium. The group denoted by the symbol R$^1$ in the average unit formula is exemplified by alkyl groups, e.g., methyl, ethyl, propyl and butyl groups, cycloalkyl groups, e.g., cyclohexyl group, and aryl groups, e.g., phenyl and totyl groups, as well as substituted monovalent hydrocarbon groups obtained by replacing a part or all of the hydrogen atoms in the above named hydrocarbon groups with substituent atoms and/or groups such as halogen atoms and cyano groups exemplified by chloromethyl, 3,3,3-trifluoropropyl and 2-cyanoethyl groups. The amount of the metallic element or elements contained in the organopolysiloxane of the formula (II) is in the range from 0.05 to 5% by weight based on the organopolysiloxane of the formula (II). A metallosiloxane compound containing a larger amount of the metallic element can be prepared according to the procedure described below only with difficulties. When the content of the metallic element is too small, the desired effect by the addition of the component (d-1) can be obtained only by unduly increasing the amount added.

The metallosiloxane compound can be prepared according to a known procedure disclosed, for example, in U.S. Pat. No. 3,008,901, Japanese Patent Publications 53-12541, 55-50970 and 57-57501 and Japanese Patent Kokai 53-65400 and 60-163966. As an example, 10 parts by weight of a terpene solution of a 2-ethylhexoate of cerium or a combination of rare earth elements, of which the principal element is cerium, containing 6% by weight of the rare earth elements are mixed with 2.1 parts by weight of tetra-n-butyl titanate and the mixture is heated with agitation and freed from terpene by distallation under gentle bubbling of nitrogen gas thereinto followed by further increase of the temperature up to 300° C., at which temperature the mixture is further agitated for 1 hour to give a clear, deep reddish brown liquid.

The compound of the second class of the component (d), i.e. component (d-2), is an organosilicon compound, i.e. organosilane or organopolysiloxane compound, having, in a molecule, at least one imino-containing aromatic group. The organosilicon compound is represented by one of the general formulas $R^2_3Si-OZ$, $ZO-(-SiR^2_2-O-)_mZ$, and $R^2_3Si-O-[-SiR^2_2-O-]_r-[-SiR^2(OZ)-O-]_s-SiR^2_3$, in which $R^2$ has the same meaning as $R^1$ defined above and Z is an imino-containing aromatic group selected from 4-anilinophenyl, N-(4-anilinophenyl)-4-aminophenyl, 4-(α-naphthylamino) phenyl and 4-(β-naphthylamino) phenyl groups. The subscript m is a positive integer not exceeding 50, r is zero or a positive integer not exceeding 47 and s is a positive integer not exceeding 10 with the proviso that r+s is not exceeding 48. When the value of m is too large or the value of r+s exceeds 48, the desired effect of improvement in the heat resistance can be obtained only by unduly increasing the amount of the compound added to the composition.

the above defined organosilicon compound having an imino-group-containing aromatic group can be prepared by the dehydrochlorination reaction between an aminophenol compound, such as 4-anilinophenol, N-(4-anilinophyenyl)-4-aminophenol, 4-(α-naphthylamino) phenol and 4-(β-naphthylamino) phenol, and an organosilicon compound having a reactive chlorine atom. The reaction can be performed, for example, by mixing the aminophenol compound and a chlorinated alkyl silane or polysiloxane compound in an equivalent proportion together with a hydrogen chloride acceptor such as ammonia, pyridine and triethyl amine in an organic solvent such as toluene and agitating the mixture at room temperature or at an elevated temperature followed by filtration of the mixture to remove the precipitated hydrochloride and stripping under a reduced pressure at an elevated temperature to remove the solvent and volatile matters. The methods described in U.S. Pat. No. 3,328,350, Japanese Patent Publications 55-18457 and 61-21591 and Japanese Patent Kokai 60-106891 are also applicable to the preparation of the compounds.

The third class compound of the component (d), i.e. component (d-3), is an organosilicon compound, i.e. organosilane or organopolysiloxane compound, having at least on hindered phenol group in a molecule. The hindered phenol group here implied is a hydroxyphenyl group having one or two tert-butyl groups at the ortho-position or positions relative to the phenolic hydroxy group. The organosilicon compounds can be represented by one of the general formulas $R^2_3SiCH_2CH_2CH_2A$, $ACH_2CH_2CH_2-(-SiR^2_2-O-)_u-SiR^2_2-CH_2CH_2CH_2A$ and $R^2_3Si-O-[-SiR^2_2-O-]_v-[-SiR^2(CH_2CH_2CH_2A)-O-]_w-SiR^2_3$, in which $R^2$ has the same meaning as defined above and A is a hindered phenol group selected from 4-hydroxy-3,5-di(-tert-butyl) phenyl, 2-hydroxy-3-tert-butyl phenyl, 2-hydroxy-3-tert-butyl-5-(4-hydroxy-3-allyl-5-tert-butyl phenyl) phenyl and 2-hydroxy-3-tert-butyl-5-(4-hydroxy-3-allyl-5-tert-butyl benzyl) phenyl groups.

These organosilicon compounds can be prepared by the addition reaction of so-called hydrosilation between an organosilicon compound having one or more of hydrogen atoms directly bonded to the silicon atoms in a molecule and an allyl phenol compound of the general formula $A-CH_2CH=CH_2$, in which A has the same meaning as defined above, in an organic solvent such as toluene and tetrahydrofuran in the presence of a catalyst such as chloroplatinic acid at a temperature of 40° to 150° C. followed by distillation to remove the solvent. Silimar known compounds prepared by the method described in Japanese Patent Publication 47-3922 can also be used for the purpose.

The amount of the above described component (d), when added, in the inventive silicone oil composition is in the range from 0.01 to 10 parts by weight or, preferably, from 0.1 to 5 parts by weight per 100 parts by weight of the component (a) in order to obtain the desired effect of improvement in the heat resistance of the composition. When the amount thereof is too small, the desired effect of improvement in the heat resistance of the composition can hardly be obtained as a matter of course. An increase in the amount thereof to exceed the above mentioned upper limit gives no particular additional advantages but instead is an economical disadvantage.

The flame-retardant silicone oil composition of the present invention is obtained by mixing the above described components (a), (b), (c) and, optionally, (d) each in a calculated and weighed amount followed by thorough agitation of the mixgture at room temperature or at an elevated temperature of 40° to 100° C. to give a homogeneous mixture followed, if necessary, by stripping of the volatiles and/or filtration to remove insolubles. It is of course optional that the thus prepared inventive silicone oil composition is further admixed with known additives such as rust inhibitors, antioxidants and the like each in a limited amount which does not affect the flame-retardancy and heat resistance of the composition.

The flame-retardant silicone oil composition of the present invention is described in more detail by way of the following examples. The term "parts" in the following description always refers to "parts by weight" and the values of viscosity appearing in the following are each of value obtained by the measurement at 25° C. the combustion test in the examples was conducted according to the procedure specified in JIS C 2101.

EXAMPLES 1 TO 7 AND COMPARATIVE EXAMPLES 1 TO 4

In each of these Examples, a silicone oil composition was prepared by admixing 100 parts of methyl vinyl polysiloxane oil expressed by the formula

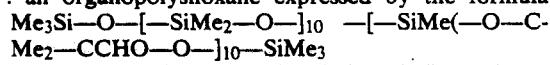

in which Me is a methyl group and Vi is a vinyl group, a vinyl siloxane-platinum complex containing 30% by weight of platinum as metal in an amount indicated in Table 1 below and an alkynyloxy-containing compound shown below in an amount also indicated in Table 1. The alkynyloxy-containing compounds used were as follows. The symbol Me in the formula denotes a methyl group.

I: 3-methyl-1-butyn-3-ol
II: 3,5-dimethyl-1-hexyn-3-ol
III: 2-trimethylsiloxy-2-ethynyl propane
IV: bis (dimethyl ethynyl methyl)oxy dimethyl silane
V: an organopolysiloxane expressed by the formula
Me$_3$Si—O—[—SiMe$_2$—O—]$_{10}$ —[—SiMe(—O—C-Me$_2$—CCHO—O—]$_{10}$—SiMe$_3$
VI: 1,2-bis(trimethylsiloxy dimethyl methyl)acetylene Each of the thus prepared silicone oil compositions either before or after the thermal aging test described below was subjected to the combustion test to give the results shown in Table 1 below by the length of time in seconds taken until the flame went out together with the % increment of the viscosity of the composition by the thermal aging.

For comparison, seven more silicone oil compositions, including the same silicone oil as such, were prepared either by omitting or decreasing the amount of the platinum complex and/or the alkynyloxy-containing compound. The results of the tests with these comparative compositions are also shown in Table 1.

The test of thermal aging of the silicone oil compositions was performed according to the following procedure: (i) 10 sheets of kraft paper for electric insulation each 200 mm by 20 mm wide having a total weight of 4.8 g were put into a thoroughly cleaned tube of hard glass having an inner diameter of 35 mm and a capacity of 300 ml and opening at both ends and the glass tube was heated at 100° C. for 24 hours under a pressure of 1 mmHg to dry the paper sheets, (ii) the glass tube was sealed at one end of welding and 200 ml of the sample oil composition were introduced into the glass tube; (iii) dry nitrogen gas was bubbled into the sample oil composition through a thoroughly cleaned glass capillary to deaerate and dehydrate the oil; and (iv) the glass tube was sealed by welding at the other end and the thus prepared glass ampule containing the oil composition and the paper sheets was kept in a thermostatted oven controlled at 150°±5° C. for 7 days.

TABLE 1

|  | Platinum complex, parts | Acetylenic compound (parts) | Seconds for flame-off Before aging | Seconds for flame-off after aging | Viscosity increase by aging, % |
|---|---|---|---|---|---|
| Example |  |  |  |  |  |
| 1 | 0.01 | I (0.03) | 11 | 11 | ±0 |
| 2 | 0.01 | II (0.01) | 10 | 12 | +2.3 |
| 3 | 0.0033 | III (0.05) | 10 | 13 | +0.5 |
| 4 | 0.017 | IV (0.05) | 10 | 11 | +3.1 |
| 5 | 0.01 | V (0.1) | 11 | 12 | +1.4 |
| 6 | 0.033 | V (1.0) | 11 | 15 | +2.1 |
| 7 | 0.017 | VI (0.1) | 10 | 14 | +0.8 |
| Comparative Example |  |  |  |  |  |
| 1 | 0.01 | — | 10 | >120* | +2.1 |
| 2 | 0 | — | >120* | — | — |
| 3 | 0.00027 | I (0.01) | >120* | — | — |
| 4 | 0.01 | I (0.0005) | 11 | >120 | +8.5 |

*not extinguished

EXAMPLE 8

The flame-retardant silicone oil composition prepared in Example 5 was further admixed with 0.005 part of benzotriazole as a corrosion inhibitor for copper and 0.1 part of an aromatic aminemodified dimethyl polysiloxane expressed by the formula

in which Me is a methyl group and Q is a 4-anilinophenyl group, and these additives were dissolved therein.

The thus prepared silicone oil composition was subjected to an aging test in contact with various materials in the following procedure; (i) the contacting material specified below as put into a thoroughly cleaned tube of hard glass having an inner diameter of 35 mm and a capacity of 300 ml and opening at both ends and the glass tube was heated at 110° C. for 24 hours under a pressure of 1 mmHg to dry the contacting material; (ii) the glass tube was sealed at one end by welding and 200 ml of the sample oil composition were introduced into the glass tube; (iii) dry nitrogen gas was bubbled into the sample oil composition through a thoroughly cleaned glass capillary to deaerate and dehydrate the oil; and (iv) the glass tube was sealed by welding at the other end and the thus prepared glass ampule containing the oil composition and the contacting material was kept in a thermostatted oven controlled at 150°±5° C. for 30 days or 60 days. The samples of the thus thermally aged silicone oil composition were evaluated for the viscosity increase and the length of time for flame-off in the combustion test to give the results shown in Table 2 below.

Materials contacted
I. Metallic materials
  A: a steel plate, 200×20×3 mm, 77.4 g
  B: a stainless steel plate, 200×20×1 mm, 39.3 g
  C: a copper plate, 200×20×1.5 mm, 29.6 g D: an aluminum plate, 200×20×1 mm, 12.7 g
E: a silicon steel plate, 200×20×1 mm, 7.8 g II. Cellulosic materials
F: a press board, 200×20×1 mm, 7.0 g
G: 10 kraft paper sheets, each 200×20×0.14 mm, 4.8 g III. Plastics and rubbers
H: a Nomex paper sheet, 200×20×0.5 mm, 8.7 g
I: 2 phenolic resin laminate sheets, each 200×20×1 mm, 15.7 g
J: 4 epoxy rein-impregnated glass tapes, each 200×20×0.3 mm, 9.2 g
K: a NBR Hycar-cork board, 200×20×3 mm, 11.0 g

TABLE 2

| Contacting material | After 30 days aging | | After 60 days aging | |
|---|---|---|---|---|
| | viscosity increase, % | seconds for flame-off | viscosity increase, % | seconds for flame-off |
| A | +2.7 | 11 | +4.2 | 10 |
| B | +4.1 | 11 | +5.1 | 12 |
| C | +5.2 | 11 | +5.5 | 11 |
| D | +2.5 | 10 | +4.3 | 13 |
| E | +4.2 | 12 | +4.5 | 12 |
| F | +1.8 | 10 | +2.3 | 10 |
| G | +2.7 | 12 | +2.7 | 12 |
| H | +4.2 | 11 | +4.0 | 9 |
| I | +4.0 | 11 | +4.4 | 11 |
| J | +4.7 | 10 | +4.5 | 9 |
| K | +0.8 | 28 | +2.3 | 25 |

What is claimed is:

1. In a flame-retardant silicone oil composition adapted for use as an electric insulation oil consisting essentially of a silicone oil and a flame retardant therefor, the improvement wherein the silicone oil is
(a) an organopolysiloxane represented by the average unit formula

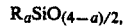

in which R is a substituted or unsubstituted monovalent hydrocarbon group and the subscript a is a positive number in the range from 1.8 to 2.3, from 0.1 to 30% by moles of the groups denoted by R in a molecule being vinyl groups and wherein the silicone oil is rendered flame retardant by the presence in the composition of, per 100 parts by weight of the silicone oil;
(b) from 0.0001 to 0.1 part by weight as platinum of a platinum compound soluble in an organic solvent; and
(c) from 0.001 to 10 parts by weight or an alkynyloxy-containing compound selected from the group consisting of
  (c-1) alkynols,
  (c-2) alkyne diols, and
  (c-3) alkynyloxy-substituted organosilicon compounds.

2. The flame-retardant silicone oil composition as claimed in claim 1 wherein the groups denoted by R other than vinyl groups are methyl groups.

3. The flame-retardant silicone oil composition as claimed in claim 1 wherein the organopolysiloxane as the component (a) has a viscosity in the range from 5 to 1000 centistokes at 25° C.

4. The flame-retardant silicone oil composition as claimed in claim 1 wherein the component (c) is an alkynyloxy-substituted organosilicon compound.

5. The flame-retardant silicone oil composition as claimed in claim 4 wherein the alkynyloxy-substituted organosilicon compound is represented by the general formula $R^1_3SiX$, $R^1_3Si-Y-SiR^1_3$, $R^1_3Si-O-(-SiR^1_2-O-)_p-(-SiR^1X-O-)_q-SiR^1_3$ or $X-(-SiR^1_2-O-)_n-SiR^1_2-X$, in which $R^1$ is a substituted or unsubstituted monovalent hydrocarbon group, X is an alkynyloxy group, Y is an alkyndioxy group, the subscript p is zero or a positive integer not exceeding 47, the subscript q is a positive integer not exceeding 48 with the proviso that p+q is a positive integer not exceeding 48 and the subscript n is zero or a positive integer not exceeding 50.

6. The flame-retardant silicone oil composition as claimed in claim 1 which further comprises from 0.01 to 10 parts by weight, per 100 parts by weight of the component (a), of
  (d) an organosilicon compound selected from the group consisting of
    (d-1) metallosiloxane compounds wherein the metallic element is cerium or a combination thereof with cerium as the principal constituent, and titanium, zirconium or hafnium,
    (d-2) organosilicon compounds having, in a molecule, at least one imino-containing aromatic group, and
    (d-3) organosilicon compounds having in the molecule at least one unit of hindered phenol.

7. The flame-retardant silicone oil composition as claimed in claim 6 wherein the organosilicon compound as the component (d) is an organosilicon compound having, in a molecule, at least one imino-containing aromatic group.

8. The flame-retardant silicone oil composition as claimed in claim 7 wherein the organosilicon compound having, in a molecule, at least on imino-containing aromatic group is represented by the general formula $R^2_3Si-OZ$, $ZO-(-SiR^2_2-O-)_m-Z$ or $R^2_3Si-O-[-SiR^2_2-O-]_r-[-SiR^2(OZ)-O-]_s-SiR^2_3$, in which $R^2$ is a substituted or unsubstituted monovalent hydrocarbon group, Z is an imino-containing aromatic group selected from the class consisting of 4-anilinophenyl, N-(4-anilinophenyl)-4-aminophenyl, 4-(α-naphthylamino) phenyl and 4-(β-naphthylamino) phenyl groups, the subscript m is a positive integer not exceeding 50, the subscript r is zero or a positive integer not exceeding 47 and the subscript s is a positive integer not exceeding 10 with the proviso that r+s is not exceeding 48.

* * * * *